April 10, 1934.  E. B. MILLER  1,954,056
ADSORBER SYSTEM
Original Filed Nov. 18, 1930
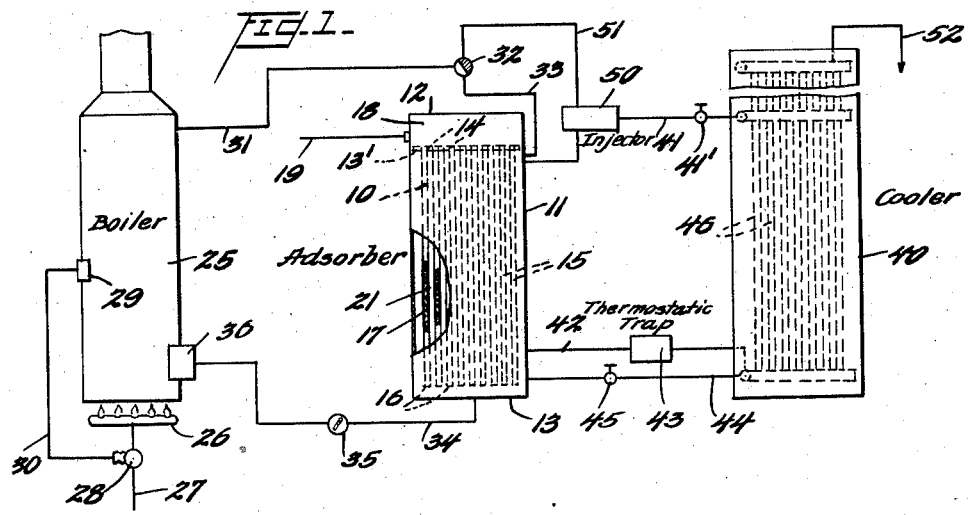
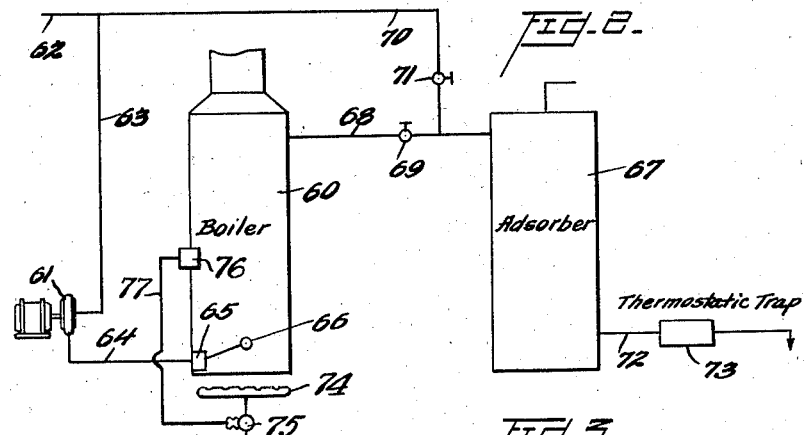
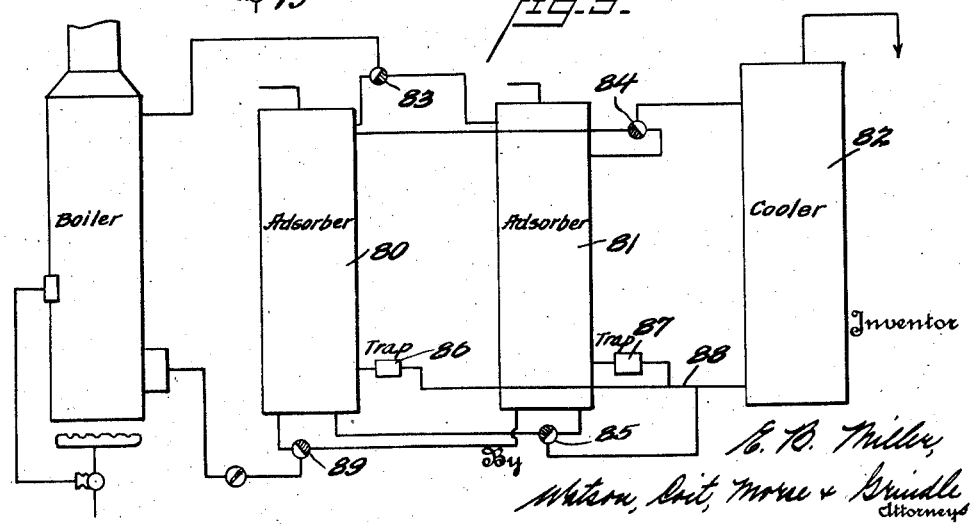

Patented Apr. 10, 1934

1,954,056

UNITED STATES PATENT OFFICE 1,954,056

ADSORBER SYSTEM

Ernest B. Miller, Baltimore, Md., assignor, by mesne assignments, to Chester F. Hockley, receiver for The Silica Gel Corporation, Baltimore, Md., a corporation of Maryland Application November 18, 1930, Serial No. 496,555
Renewed September 1, 1933

13 Claims. (Cl. 62—118)

This invention relates to adsorber systems and more particularly to a method of and apparatus for activating and cooling adsorbers.

It is a general object of the present invention to provide a novel and improved method and apparatus for the operation of adsorbers wherein activation heat is supplied by steam or other heated fluid and subsequent cooling by a suitable cooling liquid such as water.

Among the important novel features of the invention may be enumerated the following:

A. The use of a liquid cooling tank arranged to fill the adsorber jacket by gravity.

B. The use of heating fluid under pressure to return the cooling liquid from the jacket to the cooler when activation is required.

C. The provision of automatic gravity feed for the boiler while under pressure.

D. The use of a trap between the adsorber jacket and the cooler whereby the cooling liquid may be discharged from the jacket to the cooler but heating fluid is prevented from following.

E. An arrangement whereby when steam is used for heating it is all condensed in the adsorber jacket.

F. The provision of means providing thermosiphon cooling liquid circulation.

G. The provision of means whereby cooling circulation can be augmented by the heating medium.

Other and further objects and features of the invention will be more apparent to those skilled in the art upon a consideration of the accompanying drawing and following specification wherein are disclosed several exemplary embodiments of the invention with the understanding, however, that such changes may be made therein as fall within the scope of the appended claims without departing from the spirit of the invention.

In said drawing:

Figure 1 is a diagrammatic and schematic illustration of one arrangement of apparatus for heating and cooling a single adsorber;

Figure 2 is a similar view wherein cooling is effected from a source of cool liquid; and Figure 3 is a view similar to Figure 1 showing two adsorbers intended to be alternately activated and cooled whereby continuous adsorption can be effected.

In many of the widespread uses of adsorbers for treating air, gases and mixtures of air and/or gases and vapors and also for the treatment of liquids it is advisable to supplement the natural radiation from the material of the adsorbers by auxiliary cooling since the heat of adsorption, with certain adsorbents, is considerable and in many cases is sufficient to materially reduce the rate of adsorption. Furthermore, if the activating phase of the cycle of operation of the adsorber can be reduced in time so that the adsorber can again be put on adsorption the number of cycles per day can be materially increased and hence a smaller adsorber is equal in capacity to a larger adsorber wherein a fewer number of cycles are obtainable in a like period of time. Perhaps the most time consumed in the activating phase can be charged against the cooling necessary after the high temperature activation in order that the adsorbent material may be reduced to a temperature where again it begins to adsorb.

The present invention contemplates activation by a heating fluid such as steam, hot brine or the like and the subsequent rapid cooling by a cooling fluid such as water. The cooling may be continued during the adsorption phase in order to augment the rate of adsorption. While the present invention is shown in connection with a particular form of adsorber and while the preferred adsorbent is silica gel in granular form arranged in small masses with large surface areas, nevertheless the invention is equally as applicable to other forms of adsorbents disposed in various ways in adsorbers. No apparatus for use in conjunction with the adsorbers other than for the purpose of activating and cooling has been shown since the adsorbers can well be used, for instance, in such a refrigeration system as shown in my Patent No. 1,729,081, issued September 24, 1929, for Refrigeration; or in apparatus for the treatment of air for dehumidifying; or for the recovery of gases or vapors from mixtures thereof and for many other purposes which will suggest themselves to those skilled in the art.

Referring now to the drawing, there is shown in Figure 1 an adsorber 10 which may take any mechanical construction desired. For the sake of convenience of illustration and construction it is shown as comprising an outer casing or jacket 11 in the form of a closed cylinder having heads 12 and 13. Within the jacket and near the top is the tube sheet or auxiliary head 13' perforated as at 14 with a plurality of circular openings into each of which is secured, in an air-tight manner, a small diameter tube 15, which may, if desired, be closed at the opposite end as at 16 near the bottom of the jacket or be secured into a suitable header. Each of these tubes is filled with a quantity of granular, porous adsorbent material 17 and this material is, of course, exposed for adsorbing to the fluid within the space 18 formed between the head 12 and the tube sheet 13'. The pipe 19 connected into this space serves for conducting the material to be adsorbed to the adsorber and also for the discharge of the adsorbed material during activation or revivification of the adsorber. The space 21, in the jacket, surrounding the tubes is available for the heating and cooling media. By having the tubes projecting into the jacket where each can be entirely surrounded by these media maximum heating and cooling is available.

In order to supply steam for activating, a boiler 25 of any desired type is provided and preferably heated by the fluid fuel burner 26 supplied with fuel through the pipe 27 having therein a valve 28 under the control of a pressure actuated mechanism 29 through the tube 30. This assemblage of parts 28, 29 and 30 is so constructed and adjusted that the pressure in the boiler is maintained substantially constant, for as the pressure increases it acts on the mechanism 29 to partially close the valve 28 and reduce the supply of fuel to the burner and when the pressure is reduced below the desired pressure the valve 28 is opened wider. This type of control is highly desirable since steam from the boiler is used intermittently.

The boiler is connected to supply steam, through the pipe 31, into the jacket space 21 through the valve 32 and the pipe 33. The bottom of the jacket space 21 is connected for the return of condensate by pipe 34 through a check valve 35 to the lower portion of the boiler where a float feed apparatus 36 maintains a substantially constant water level in the boiler.

A cooling tank 40 is provided and connected by means of a pipe 41 having valve 41' therein and leading form near the top of the tank to the top of the jacket space. Connected near the lower part of the tank and the lower part of the jacket space is a pipe 42 affording communication between the tank and jacket, and interposed in this pipe is an automatic steam trap 33. A second pipe 44 paralleling this one is provided with a valve 45. The cooler comprises a series of parallel tubes 46 arranged in a jacket which is open at the top and bottom in order that air may flow therethrough by natural draft and cool the water continuously. Conversely, the water could be contained in a tank through which a plurality of pipes extend for the passage of cooling air.

In operation and assuming the adsorber to be on the adsorption phase of the cycle, the two-way valve 32 is adjusted so that steam is prevented from flowing into the jacket and the valves 41' and 45 are opened. This permits water to flow by gravity from the cooler to the jacket space 21 and since the cooler is of larger capacity than the jacket the jacket will be filled to the level of the pipe 41 and a quantity of water remain in the cooler. Heat is transferred from the adsorbent to the water which will circulate between the cooler and the adsorber jacket either by thermo-siphon action or under the influence of the injector 50 which may be supplied with steam through the pipe 51 by a proper setting of the two-way valve 32. Under either condition of water circulation the heated water will be delivered to the cooler where it will be cooled by air passing through or over the pipes therein and the water will be returned to the adsorber jacket. In this manner effective and rapid cooling of the adsorbent will be maintained while the jacket and cooler are at atmospheric pressure.

When adsorption is completed to an economical degree of saturation the valves 41' and 45 will be closed and the valve 32 will be adjusted so as to supply steam to the upper part of the jacket through the pipe 33. This causes the boiler pressure to be exerted on the surface of the water in the jacket, which is thus caused to flow out of the jacket under this pressure through the thermostatic trap 43 into the cooler. When the steam reaches the trap the valve therein closes automatically, in a well known manner, and steam is prevented from being delivered to the cooler although an overflow pipe 52 is provided for emergencies as well as to maintain the cooler at atmospheric pressure. Steam continues to be delivered to the jacket and since there is no exit all of the steam is condensed and its heat given up for activating the adsorbent. As fast as the steam condenses, the water collecting in the bottom of the jacket is delivered either through the trap 43 to the cooler or returns to the boiler for feed water. The adsorber is at a higher level than the boiler so that a supply of water is always available and the proper level of liquid is automatically maintained in the boiler under the action of the float valve. Since the boiler and the adsorber jacket are at this time under the same pressure the water will return by gravity to the boiler, the check valve being provided to insure against a blowing out of the water in the boiler by the steam therein.

As soon as activation is completed the steam is cut off at the valve 32. The condensation in the jacket will cause water to flow therein as soon as the valves 41' and 45 have been opened and the adsorbent will be cooled and ready for a new adsorption phase.

The apparatus may be modified by the provision of forced draft for the cooler, the elimination of the injector or the substitution therefor of a suitable water circulating medium as for instance a pump.

The cycle may be made to recur periodically and automatically by the use of some mechanical means for changing the valves. It is obvious that any well known method may be resorted to. For instance, electric, steam or compressed air operated valves may be used in conjunction with a hand-wound, electric or gas operated timing mechanism.

In Figure 2 the apparatus shown is for use where cooling water is available in quantity for continuous flow. The boiler in this case has been retained but the cooling tank has been eliminated. The boiler 60 is constructed in a manner similar to that in the previous embodiment and a feed water pump 61 is shown in place of the apparatus for supplying the feed water from the adsorber jacket. This pump is shown as being fed from the water supply pipe 62 through the branch pipe 63 and the delivery from the pump is through the branch pipe 64 under the control of a valve 65 actuated by the float 66 to maintain a substantially constant water level in the boiler. The adsorber 67 which is similar in construction to that described in connection with Figure 1 is connected to the boiler by the single pipe 68 having therein the valve 69 and to this pipe on the adsorber side of the valve 69 is connected a branch water pipe 70 containing the valve 71. A single discharge pipe 72 from the adsorber contains a thermostatic trap 73.

The fluid fuel burner 74 is provided with a valve 75 actuated automatically under the control of the pressure responsive device 76 connected thereto by the tube 77 so that as the pressure increases, the supply of fuel is reduced and vice versa, in order that a substantially constant pressure be maintained in the boiler irrespective of the rate of withdrawal of steam therefrom.

In operation, during adsorption the valve 69 is closed and the valve 71 is opened whereby water flows through the jacket and is wasted through the thermostatic trap. When activation is required valve 71 is closed and valve 69 opened whereby steam at boiler pressure is delivered to the adsorber forcing out the water and displacing it, closing the thermostatic trap and being condensed in the jacket. The condensate is, of course, delivered out through the thermostatic trap from time to time automatically.

In the event that two or more adsorbers are required to operate for continuous adsorption, one being adsorbing while the other is being activated and cooling, the arrangement shown in Figure 3 is resorted to. Here the construction may be identical with that shown in Figure 1 except that two adsorbers 80 and 81 are provided each constructed in accordance with the description of the adsorber in Figure 1 and a similar cooler 82 is provided. Figure 3 differs from Figure 1 only by the addition of an adsorber and the appropriate valves whereby one or the other of the two adsorbers can be selected. Here the valve 83 is a two-way valve so that steam can be delivered to either one of the adsorbers but not both. Likewise the valve 84 is a two-way valve whereby water from the cooler can be delivered to either of the adsorbers but not both.

At the lower part of the adsorbers the valve 85 is a two-way valve for the return of water from the cooler to the adsorbers and permitting but one to be connected to the cooler at a time. Each adsorber has its thermostatic traps 86 and 87 and these are both connected to the common discharge line 88 leading to the lower part of the cooler.

In the operation of Figure 3 the valve 83 is adjusted for instance to supply steam to the adsorber 80 in which case the condensate return two-way valve 89 is adjusted to permit return of water from the adsorber jacket 80 to the boiler and the valves 84 and 85 are adjusted for water circulation to the adsorber 81 which will be on the adsorption phase. When it is desired to reverse the positions of the adsorbers in the circuit all valves are reversed simultaneously by any mechanical mechanism desired. It will be noted that in this figure no injectors are shown but that thermo-siphon cooling is resorted to, however, any form of cooling fluid circulation can be used. The construction in Figure 3 provides better load conditions for both the boiler and the cooler for they are in more nearly continuous use than in the embodiments of Figures 1 and 2. Obviously the construction of Figure 3 can be amplified by the addition of more adsorbers in an obvious manner.

Where steam is available the boiler can be eliminated retaining the cooler if a constant supply of water is not available.

Having thus described the invention, what is claimed as new and desired to be secured by Letters Patent is:—

1. In an adsorber system, in combination, an adsorber containing adsorbent, means to circulate a cooling fluid in indirect contact therewith to cool the adsorbent during adsorption, means to deliver a heating medium under pressure into indirect contact with said adsorbent to replace the cooling fluid and activate the adsorbent, a discharge passage for the cooling fluid and a trap in said passage to prevent the flow of the heating medium therethrough.

2. In an adsorber system, in combination, an adsorber, a jacket encasing said adsorber, a source of steam, a steam pipe from said source to said jacket, a discharge pipe near the bottom of said jacket, a steam trap in said pipe, a source of water for supply to said jacket for cooling the adsorber and means to return the cooling water by said steam to said source through said trap.

3. In an adsorber system, in combination, an adsorber containing adsorbent, a fluid container in heat transferring relationship to the adsorbent, a boiler, a steam pipe from said boiler to said container, a fluid fuel burner for said boiler, steam pressure responsive means to regulate the flow of fuel to said burner to maintain a substantially constant steam pressure in the boiler, a discharge pipe from said container, a steam trap in said pipe, and means to supply a cooling liquid to said container.

4. In an adsorber system, in combination, an adsorber, a container in heat exchanging relationship to the adsorbent in said adsorber, a boiler, means to maintain a constant steam pressure in said boiler, a steam pipe from said boiler to said container, a water connection from the bottom of said container to said boiler, means thereon to maintain a constant water level in said boiler, a cooling tank having a connection to the bottom of said container and a connection to the top of said container, a connection between the bottom of said container and tank, a steam trap therein, and valves in said steam pipe and said top and first mentioned bottom connections between the tank and container.

5. In an adsorber system, in combination, an adsorber, a container in heat exchanging relationship to adsorbent in said adsorber, a source of steam, a pipe from said source to said container, a valve therein, a cooling fluid tank, top and bottom connections between said container and tank, a valve in each connection adapted to be opened alternately with said first mentioned valve for heating and cooling said adsorbent respectively, and a steam trapped connection between said container and tank to discharge condensed steam into said tank.

6. In an adsorber system, in combination, an adsorber, a container in heat exchanging relationship to adsorbent in said adsorber, a source of steam, a pipe from said source to said container, a valve therein, a cooling liquid tank, top and bottom connections between said container and tank, a valve in each connection adapted to be opened alternately with said first mentioned valve for heating and cooling said adsorbent respectively, a steam trapped connection between said container and tank to discharge condensed steam into said tank, and means using steam from said source to augment the liquid circulation from tank to container during cooling.

7. In an adsorber system, in combination, an adsorber, a container in heat exchanging relationship to said adsorber, a steam boiler, a pipe from said boiler to said container, a valve therein, a cooling liquid tank, top and bottom connections between said container and tank, a valve in each connection adapted to be opened alternately with said first mentioned valve for heating and cooling said adsorber respectively, a steam trapped connection between said container and tank to discharge condensed steam into said tank, and means to admit liquid from the container to the boiler during heating.

8. In an adsorber system, in combination, an adsorber, a closed fluid container associated therewith, a boiler of the constant steam pressure type, a cooling water tank arranged to supply water by gravity to said container, means for joining said container and tank into a circulating system for filling the container and cooling the adsorber during adsorption, means for placing said boiler and container into circuit to heat the adsorber and discharge the water therein into said tank, and means to automatically prevent the discharge of steam from said container.

9. In an adsorber system, in combination, an adsorber, a closed fluid container associated therewith, a boiler of the constant steam pressure type, a cooling water tank arranged to supply water by gravity to said container, means for joining said container and tank into a circulating system for filling the container and cooling the adsorber during adsorption, means for placing said boiler and container into circuit to heat the adsorber and discharge the water therein into said tank, means to automatically prevent the discharge of steam from said container, and means for admitting water from said container to said boiler during heating to maintain the water level therein.

10. In an adsorber system, in combination, an adsorber, a closed fluid container associated therewith, a boiler of the constant steam pressure type, a cooling water tank arranged to supply water by gravity to said container, means for joining said container and tank into a circulating system for filling the container and cooling the adsorber during adsorption, means for placing said boiler and container into circuit to heat the adsorber and discharge the water therein into said tank, means to automatically prevent the discharge of steam from said container, means for admitting water from said container to said boiler during heating to maintain the water level therein, and means actuated by steam from said boiler to augment circulation between the tank and container.

11. In an adsorber system, in combination, an adsorber, a closed fluid container in heat exchanging relationship to adsorbent in the adsorber, a source of steam, a cooling tank substantially full of water and having its bottom near the level of the bottom of the container, means to admit water from the tank to the container, means to facilitate a circulation between tank and container to cool the adsorbent, means to admit steam from said source to the container to return the water to the tank and heat the adsorbent, and means to confine the steam to the container.

12. In an adsorber system, in combination, an adsorber, a closed liquid container associated therewith, a steam boiler, means to maintain a substantially constant steam pressure therein, a cooling tank substantially full of water and having its bottom near the level of the bottom of the container, means to admit water from the tank to the container, means to facilitate a circulation between tank and container to cool the adsorber, means to admit steam from the boiler to the container to return the water to the tank and heat the adsorber, means to confine the steam to the container, and means to supply feed water to the boiler from the container.

13. In an adsorber system, in combination, an adsorber, a closed liquid container in heat exchanging relationship to adsorbent therein, a steam boiler, a fluid fuel burner, means actuated by steam pressure in the boiler to regulate the fuel flow to maintain a substantially constant pressure in the boiler, a steam connection to the container, a source of cooling fluid, a connection to the container from said source, means to supply feed water to the boiler from said source, a discharge pipe from said container, a steam trap therein, and means to admit either steam or cooling fluid to said container.

ERNEST B. MILLER.